United States Patent
Kim et al.

(10) Patent No.: US 7,986,972 B2
(45) Date of Patent: Jul. 26, 2011

(54) METHOD FOR TRANSMITTING DATA IN A COMMUNICATION SYSTEM

(75) Inventors: Sung-Jin Kim, Suwon-si (KR); Myeon-Gyun Cho, Seongnam-si (KR); Ho-Jin Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 773 days.

(21) Appl. No.: 11/702,907

(22) Filed: Feb. 6, 2007

(65) Prior Publication Data

US 2007/0249401 A1    Oct. 25, 2007

Related U.S. Application Data

(60) Provisional application No. 60/765,764, filed on Feb. 6, 2006.

(30) Foreign Application Priority Data

Jun. 30, 2006  (KR) .................. 10-2006-0061118

(51) Int. Cl.
    *H04M 1/00*    (2006.01)
(52) U.S. Cl. ................. 455/562.1; 455/452.1; 370/338
(58) Field of Classification Search ........ 455/272–279.1, 455/423–425, 550.1–562.1; 375/259–267, 375/376

See application file for complete search history.

(56) References Cited

U.S. PATENT DOCUMENTS

| | | | |
|---|---|---|---|
| 2002/0177447 A1* | 11/2002 | Walton et al. | 455/452 |
| 2003/0223391 A1* | 12/2003 | Malaender et al. | 370/334 |
| 2004/0136349 A1* | 7/2004 | Walton et al. | 370/338 |
| 2005/0032521 A1* | 2/2005 | Lee et al. | 455/450 |
| 2005/0192019 A1* | 9/2005 | Kim et al. | 455/452.1 |
| 2005/0207367 A1* | 9/2005 | Onggosanusi et al. | 370/315 |
| 2006/0120470 A1* | 6/2006 | Hwang et al. | 375/260 |
| 2006/0209980 A1* | 9/2006 | Kim et al. | 375/267 |
| 2006/0250963 A1* | 11/2006 | Jin et al. | 370/236 |
| 2006/0281421 A1* | 12/2006 | Pan et al. | 455/126 |
| 2007/0098106 A1* | 5/2007 | Khojastepour et al. | 375/267 |
| 2007/0223422 A1* | 9/2007 | Kim et al. | 370/334 |
| 2007/0223423 A1* | 9/2007 | Kim et al. | 370/334 |
| 2007/0254652 A1* | 11/2007 | Khan et al. | 455/435.1 |
| 2008/0013610 A1* | 1/2008 | Varadarajan et al. | 375/221 |
| 2008/0080635 A1* | 4/2008 | Hugl et al. | 375/267 |
| 2008/0132281 A1* | 6/2008 | Kim et al. | 455/562.1 |
| 2009/0175320 A1* | 7/2009 | Haustein et al. | 375/219 |

FOREIGN PATENT DOCUMENTS

| | | |
|---|---|---|
| KR | 20050015730 A | 2/2005 |
| KR | 20050071620 A | 7/2005 |
| KR | 20050082153 A | 8/2005 |
| KR | 20060082016 A | 7/2006 |
| KR | 20060096360 A | 9/2006 |

* cited by examiner

*Primary Examiner* — Kent Chang
*Assistant Examiner* — Kashif Siddiqui
(74) *Attorney, Agent, or Firm* — The Farrell Law Firm, P.C.

(57) ABSTRACT

A method is provided a method for transmitting data in a MIMO communication system. The method includes receiving feedback information including channel quality information of transmission antennas from terminals; selecting one of a multi-user mode and a single user mode according to the channel quality information; extracting information for the selected mode from the feedback information; selecting at least one terminal and a preceding matrix of at least one transmission antenna through which data is transmitted according to the extracted information and the selected mode; and transmitting data using the selected precoding matrix and information of the selected terminal.

6 Claims, 2 Drawing Sheets

| Mode | MU | | SU | | | | |
|---|---|---|---|---|---|---|---|
| Parameters | Index$_1$ | CQI$_1$ | Indicator | Index$_2$ | CQI$_2$ | ... | CQI$_M$ |
| #Bits | [log$_2$M] | N$_Q$ | 1 | [log$_2$M] | N$_Q$ | ... | N$_Q$ |

FIG.2

| Mode | MU | | SU | | | | |
|---|---|---|---|---|---|---|---|
| Parameters | Index$_1$ | CQI$_1$ | Indicator | Index$_2$ | CQI$_2$ | CQI$_3$ | CQI$_4$ |
| #Bits | 2 | 4 | 1 | 2 | 4 | 4 | 4 |

FIG.3

METHOD FOR TRANSMITTING DATA IN A COMMUNICATION SYSTEM

PRIORITY

This application claims priority to an application filed with United State Patent and Trademark Office on Feb. 6, 2006 and assigned Provisional Application Ser. No. 60/765,764, and filed in the Korean Intellectual Property Office on Jun. 30, 2006 and assigned Serial No. 2006-61118, the contents of both of which are incorporated herein by reference.

BACKGROUND OF THE INVENTION

1. Field of the Invention

The present invention relates to a communication system, and more particularly to a method for transmitting data in a multi-user Multiple-Input Multiple-Output (MIMO) communication system.

2. Description of the Related Art

A MIMO system is one of the important technologies used to achieve a high rate and a high reliability of data transfer in wireless channels. In the case where a feedback channel is used, a transmitter can use channel information as part of the feedback. In an actual system, determined feedback channel capacity is permitted. Therefore, in the multi-user channel environment, a method for designing a transmitter partially uses channel knowledge. Recently, research into a multi-user diversity has been actively conducted in order to output a large quantity of data under a multi-user communication environment in which a packet is transmitted to a user terminal having the highest Signal-to-Noise Ratio (SNR). The conventional research for the multi-user diversity may insufficiently use user diversity in the case where transmission antennas are allocated to different users. Therefore, in a multi-user MIMO system, determined feedback information and user diversity are simultaneously considered in order to design a transmission preprocessing technology, i.e. a transmission preceding.

Further, since the capacity of the feedback channel is limited, it is necessary to restrict an uplink transmission ratio for each user. In order to simultaneously support a downlink transmission for a single user and multiple users in the MIMO system, more feedback information is transmitted from a receiver to a transmitter. Thus, there is a problem in that feedback overhead increases.

SUMMARY OF THE INVENTION

Accordingly, the present invention has been made to solve at least the above-mentioned problems occurring in the prior art, and it is an aspect of the present invention to provide a feedback method for a multi-user MIMO communication system, which can reduce the amount of feedback information without exhibiting a degradation of the total rate performance.

In order to accomplish the aspect of the present invention, there is provided a method for transmitting data in a MIMO communication system. The method includes receiving feedback information including channel quality information of transmission antennas from terminals; selecting one of a multi-user mode and a single user mode according to the channel quality information; extracting information for the selected mode from the feedback information; selecting at least one terminal and a precoding matrix of at least one transmission antenna through which data is transmitted according to the extracted information and the selected mode; and transmitting data using the selected precoding matrix and information of the selected terminal.

In order to accomplish the aspect of the present invention, there is provided a method for transmitting data in a MIMO communication system. The method includes measuring a signal-to-noise ratio for transmission antennas using signals received the transmission antennas; selecting one transmission antenna having an optimized signal-to-noise ratio for a multi-user mode; selecting a transmission antenna used for a single user mode; configuring feedback information, which includes first feedback information having information of the selected antenna for the multi-user mode and a signal-to-noise ratio corresponding to the selected antenna for the multi-user mode, and second feedback information having information of the selected antenna for the single user mode and a signal-to-noise ratio corresponding to the selected antenna for the single user mode; and transmitting data including the configured feedback information.

In order to accomplish the aspect of the present invention, there is provided a system for transmitting data in a MIMO communication system. The system includes a Base Station (BS) for receiving feedback information including channel quality information of transmission antennas from terminals, selecting one of a multi-user mode and a single user mode according to the channel quality information, extracting information for the selected mode from the feedback information, selecting at least one terminal and a precoding matrix of at least one transmission antenna through which data is transmitted according to the extracted information and the selected mode, and transmitting data using the selected precoding matrix and information of the selected terminal.

In order to accomplish the aspect of the present invention, there is provided a system for transmitting data in a MIMO communication system. The system includes a terminal for measuring a signal-to-noise ratio for transmission antennas using signals received the transmission antennas, selecting one transmission antenna having an optimized signal-to-noise ratio for a multi-user mode, selecting a transmission antenna used for a single user mode, configuring feedback information, which includes first feedback information having information of the selected antenna for the multi-user mode and a signal-to-noise ratio corresponding to the selected antenna for the multi-user mode, and second feedback information having information of the selected antenna for the single user mode and a signal-to-noise ratio corresponding to the selected antenna for the single user mode, and transmitting data including the configured feedback information.

BRIEF DESCRIPTION OF THE DRAWINGS

The above and other objects, features, and advantages of the present invention will be more apparent from the following detailed description taken in conjunction with the accompanying drawings, in which:

FIG. 2 is a diagram illustrating feedback information according to the present invention; and FIG. 3 is a diagram illustrating feedback information according to the present invention.

DETAILED DESCRIPTION OF THE PREFERRED EMBODIMENT

Figure 1:
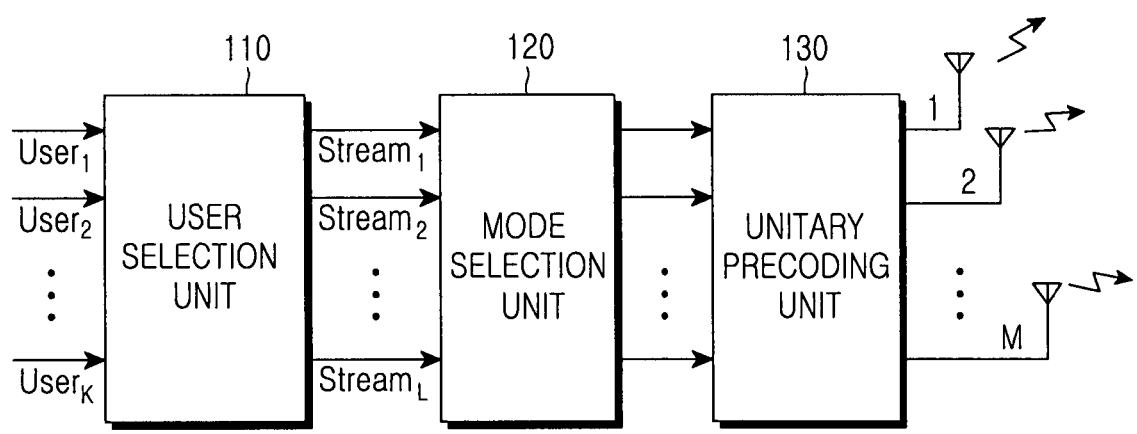
FIG. 1 is a block diagram illustrating a transmitter of a wireless communication system according to the present invention.

Hereinafter, a preferred embodiment of the present invention will be described in detail with reference to the accompanying drawings. In the following description of the present invention, a detailed description of known functions and configurations incorporated herein will be omitted to avoid making the subject matter of the present invention unclear. Terms used hereinafter are defined in consideration of functions in the present invention, and may have different meanings according to operator's intention or custom. Thus, the terms should be defined based on detail of the present invention.

The present invention provides a feedback method for reducing feedback information in a multi-user Multiple-Input Multiple-Output (MIMO) transmission scheme based on preceding.

FIG. 1 is a block diagram illustrating a transmitter of a wireless communication system to which the feedback method according to the present invention is applied.

It is assumed that the present invention relates to a downlink communication system having a large number of multi-users K corresponding to multi-transmit antennas of a remote node. As shown in FIG. 1, the transmitter according to the present invention includes a user selection unit 110, a mode selection unit 120, and a unitary preceding unit 130.

The user selection unit 110 estimates Adaptive Modulation and Coding (AMC) information using feedback information received from user terminals (not shown), selects users to which data is transmitted based on the estimated information, and outputs data, which is to be transmitted to the user terminals, in the form of beams. The mode selection unit 120 transmits L beams from the user selection unit 110 to the unitary precoding unit 130. The unitary precoding unit 130 encodes and modulates the beams transmitted from the mode selection unit 120 depending on the AMC information, so as to transmit the beams through a corresponding transmit antenna.

Hereinafter, a multi-user wireless downlink communication system including remote nodes with multi transmit antennas shown in FIG. 1, and multi reception antennas for each user will be described.

Assuming that each remote node includes M transmission antennas, and K users have $N_k$ reception antennas, a total number of reception antennas for the system is calculated by Equation (1):

$$N = \sum_{k=1}^{K} N_k \quad (1)$$

Further, the channel is designed as a frequency flat block fading and additive white Gaussian noise channel. Interference from neighboring cells is designed as additive Gaussian noise because the interference is concentrated on a single cell model. A channel output of a receiver k is expressed by Equation (2):

$$y_k = H_k W_x + Z_k \quad (2)$$

M×1 input signal vector x is transmitted by a remote node and has an electric power less than a total electric power condition P. Specifically, $tr(E|xx^H|) \leq P$, and W indicates a unitary conversion matrix. Further, M×1 vector $Z_k$ is an arbitrary additive noise for user k, and $Z_k \sim N$ are (0, 1). The channel $H_k$ is an $N_k \times M$ complex matrix which includes components such as independently and identically distributed zero-mean complex-Gaussian random variables. It is assumed that the components are independent of all users and antennas of users. Generally, the remote nodes have limited channel knowledge because of delayed loss feedback signaling.

The present invention provides a feedback method for allowing single user and multi-user precoding transmission in a transmitter. To accomplish this purpose, each user must contain two types of channel quality information (CQI) in the feedback information for the single user mode and the multi user mode and transmit the feedback information. Specifically, the remote node receives all of the CQI for the single user mode and the CQI for the multi-user mode, and selects a mode suitable for a transmission environment using the received information. At this time, since the feedback information expands, overhead may increase. Thus, the present invention provides an efficient feedback method capable of reducing the feedback overhead while supporting all of the single user mode and the multi-user mode.

FIG. 2 is a diagram illustrating feedback information according to the present invention.

As shown in FIG. 2, the feedback information generally includes an information field for the multi-user mode (hereinafter, referred to as a multi-user mode field), and information for the single user mode (hereinafter, referred to as a single user mode field). The multi-user mode field has an index and $CQI_1$ as a sub-field. Further, the single user mode field has an indicator, an $index_2$, and M−1 CQIs ($CQI_2, \ldots, CQI_M$).

The $index_1$ indicates an index of an antenna having the maximum Signal to Interference and Noise Ratio (SINR) when all the M transmission antennas are selected in order to transmit data in the multi-user mode. The $CQI_1$ shows an SINR value of the antenna corresponding to the $index_1$.

The indicator is turned off when all the M transmission antennas are selected in order to transmit data in the single user mode (for example, a field value is set to zero), while being turned on when the transmission antennas less than M are selected (for example, the field value is set to one).

The $index_2$ shows an index of an antenna which is not used for data transmission among the M antennas. If the number of antennas not being used is at least one, one antenna is indicated by using the $index_2$ and the CQI value corresponding to an index of each of the unused residual antennas is set to zero, thereby indicating the indexes of the unused antennas. At this time, the combination of the antennas, which has the maximum of the total transmission ratio, is selected. Therefore, the antennas, which do not belong to the combination of the antennas, are regarded as unused antennas.

In the case where all the M transmission antennas are selected in the single user mode so that the indicator is turned off, the M CQI values ($CQI_1, \ldots, CQI_M$) can be obtained through the decoding at the receiver. The CQI values ($CQI_2, \ldots, CQI_M$) among the above CQI values are mapped to the antennas excluding the antennas corresponding to the $index_1$ which is mapped to the $CQI_1$ of the multi-user mode filed. In the receiver, the CQI values are decoded so that each of the $CQI_1, \ldots, CQI_M$ are mapped to correspond to each antenna according to an order of the CQI.

When a number of transmission antennas less than M are selected and the indicator is turned on in the single user mode, the CQI values ($CQI_2, \ldots, CQI_M$) may be obtained from an adaptive antenna (ASS) which is selected independently of the $CQI_1$, or through the decoding of the receiver. The CQI values ($CQI_2, \ldots, CQI_M$) are mapped to the antennas excluding the antennas corresponding to the $index_2$ which are disused for the data transmission, respectively. At this time, the antennas corresponding to the CQI having a value of zero are excluded, and each CQI is decoded according to an order of the physical antennas.

FIG. 3 is a diagram illustrating feedback information according to the present invention in the case where a user terminal has four antennas and a remote node has four antennas.

As shown in FIG. 3, as M becomes four, the CQI values include three values from $CQI_2$ to $CQI_4$.

Hereinafter, the feedback method having the above-mentioned feedback information structure according to the present invention will be described in detail.

First, the user terminal measures the SINR for the all transmission antennas, and estimates a rank to maximize capacity taking into consideration the measured SINR.

Further, the user terminal calculates the CQI values ($CQI_1, \ldots, CQI_M$) corresponding to each from beam 1 to beam M of the precoding unit, and reports the CQI values to the remote node.

Further, the user terminal reports a precoded beam index of a firstly decoded stream to the remote node. This stream is an exclusive stream scheduled for the corresponding user in the multi-user mode. If the user terminal reports only one rank channel to the remote node, one of the CQI values is not zero while the residual CQI values become zero.

Further, in the single user mode, the transmission antenna used for the data transmission can be directly indicated through the $index_2$ of the feedback information, or indirectly indicated through the CQI values. Hereinafter, the former is referred to as an active rank adaptation scheme, and the latter is referred to as an implicit rank adaptation scheme.

Particularly, according to the active rank adaptation scheme, in the single user mode, the user terminal indicates whether all M antennas are used or if less than M antennas are used, through the $index_2$. In the case where low rank channels, i.e. MIMO channels, are correlated with one another and not allowed to be independent channels so as to be dependent on one another, so that the actual number of the independent channels is less than the number of the antennas, the user terminal has only to perform the feedback of the CQI values corresponding to the effective ranks. However, in the case of the indirect rank adaptation scheme in which the CQI values of the disused antennas are set to zero, the beam of the antenna corresponding to the zero-CQI must not be used. This scheme is simple and has an advantage in that an additive signaling is not required, but the user terminal always performs the feedback for the M CQI values.

Then, the transmitter selects one of the multi-user mode and the single user mode, and extracts information suitable for the selected mode from the feedback information. Next, the transmitter determines the optimum users with respect to the transmission antennas.

If a peak-data transmission ratio or a total data transmission ratio must be increased, a scheduler of the transmitter determines the number of active buffers, based on the CQI values included in the feedback information received from the user terminal. The active buffer refers to a buffer for the user terminals excluding user terminals operating in an idle mode, which are receiving a service or awaiting to receive a service.

Therefore, when the single user mode is selected while a user terminal is scheduled, the scheduler of the transmitter selects a user terminal having the maximum total capacity quantified according to the total processing amount. On the other hand, when the multi-user mode is selected, the scheduler of the transmitter selects a user terminal reporting the CQI to the transmitter in order to maximize the capacity. The remote node compares the single user mode with the multi-user mode depending on the CQI values received from the user terminals, and selects the mode having a larger total capacity than that of another mode.

Further, when the scheduled user terminal reports zero-CQI to the remote node, the transmitter turns off the beam corresponding to the zero-CQI, so that the electric power is redistributed to the residual beams excluding the beam turned off.

In order to further reduce the feedback overhead, the index field ($index_2$ of FIG. 2) in the single user mode may be removed. Further, the number of the CQIs, may be reduced for the single user mode.

As described above, in the feedback method according to the present invention, the terminal can transmit to the remote node all information for the single user mode and information for the multi-user mode as the feedback information, and the remote node can select and use the information suitable for the selected mode from the feedback information transmitted from the terminal, thereby using the single user mode and the multi-user mode.

While the invention has been shown and described with reference to the preferred embodiments thereof, it will be understood by those skilled in the art that various changes in form and details may be made therein without departing from the spirit and scope of the invention as defined by the appended claims.

What is claimed is:

1. A method for transmitting data in a Multiple-Input Multiple-Output (MIMO) communication system, the method comprising:

receiving feedback information including channel quality information of transmission antennas from terminals, wherein the feedback information comprises first feedback information for a multi-user mode and second feedback information for a single user mode;

selecting one of the multi-user mode and the single user mode according to the channel quality information;

extracting information for the selected mode from the feedback information;

selecting at least one terminal and a precoding matrix of at least one transmission antenna through which data is transmitted according to the extracted information and the selected mode; and transmitting data using the selected precoding matrix and information of the selected terminal:

wherein the first feedback information for the multi-user mode comprises a first index of an antenna among the transmission antennas, which maximizes a signal to noise ratio, and a single signal-to-noise ratio corresponding to the first index;

wherein the second feedback information for the single user mode comprises a second index of an antenna among the transmission antennas, which is unused for the data transmission, and one or more signal-to-noise ratios each corresponding to an antenna excluding unused antennas; and wherein the second feedback information for the single user mode further comprises an indicator. wherein the indicator is turned off when all of the transmission antennas are selected in order to transmit data in the single user mode, and the indicator is turned on when fewer than all of the transmission antennas are selected.

2. The method as claimed in claim 1, wherein the feedback information for the single user mode further includes information indicating a number of antennas among the transmission antennas, which are used for the data transmission.

3. The method as claimed in claim 2, wherein in the case where two or more antennas are unused, the signal-to-noise ratio corresponding to an antenna excluding the index of antennas is set to zero.

4. A system for transmitting data in a Multiple-Input Multiple-Output (MIMO) communication system. the system comprising:

a Base Station (BS) for receiving feedback information including channel quality information of transmission antennas from terminals, wherein the feedback information comprises first feedback information for a multi-user mode and second feedback information for a single user mode, selecting one of the multi-user mode and the single user mode according to the channel quality information, extracting information for the selected mode from the feedback information, selecting at least one terminal and a precoding matrix of at least one transmission antenna through which data is transmitted according to the extracted information and the selected mode, and transmitting data using the selected precoding matrix and information of the selected terminal;

wherein the first feedback information for the multi-user mode comprises a first index of an antenna among the transmission antennas which maximizes a signal to noise ratio, and a single signal-to-noise ratio corresponding to the first index;

wherein the second feedback information for the single user mode comprises a second index of an antenna among the transmission antennas, which is unused for the data transmission, and one or more signal-to-noise ratios each corresponding to an antenna excluding unused antennas; and wherein the second feedback information for the single user mode further comprises an indicator, wherein the indicator is turned off when all of the transmission antennas are selected in order to transmit data in the single user mode, and the indicator is turned on when fewer than all of the transmission antennas are selected.

5. The system as claimed in claim 4, wherein the feedback information for the single user mode further includes information indicating a number of antennas among the transmission antennas, which are used for the data transmission.

6. The system as claimed in claim 5, wherein in the case where two or more antennas are unused, the signal-to-noise ratio corresponding to an antenna excluding the index of antennas is set to zero.

* * * * *